United States Patent [19]

Kawasaki

[11] Patent Number: 5,329,549
[45] Date of Patent: Jul. 12, 1994

[54] SIGNAL PROCESSING METHOD FOR A GPS RECEIVER

[75] Inventor: Kenichiro Kawasaki, Saitama, Japan

[73] Assignee: Pioneer Electronic Corporation, Tokyo, Japan

[21] Appl. No.: 100,143

[22] Filed: Aug. 2, 1993

[30] Foreign Application Priority Data

Aug. 5, 1992 [JP] Japan .................................. 4-208768

[51] Int. Cl.⁵ .............................................. H04L 7/04
[52] U.S. Cl. ............................................ 375/1; 375/115
[58] Field of Search ...................... 375/1, 115

[56] References Cited

U.S. PATENT DOCUMENTS 5,101,416  3/1992  Fenton et al. .......................... 375/1

Primary Examiner—Gilberto Barrón, Jr.
Attorney, Agent, or Firm—Sughrue, Mion, Zinn, Macpeak & Seas

[57] ABSTRACT

A method for searching a carrier frequency and code phase of a signal received by a GPS receiver. The method includes steps of: quantizing the received signal; sampling the quantized signal at a first speed by a carrier frequency generated in the receiver; storing the samples in memory at a first speed; reading the samples from memory at a second speed; and determining the correlation between a code of the carrier frequency generated in the receiver and the received signal. The second speed is faster than the first speed.

2 Claims, 5 Drawing Sheets

SIGNAL PROCESSING METHOD FOR A GPS RECEIVER

BACKGROUND OF THE INVENTION

1. Field of the Invention

The present invention relates to a signal processing method for a Global Positioning System GPS receiver.

2. Prior Art

Some of the signals transmitted from satellites implemented in a Global Positioning System, hereinafter referred to as GPS, are available for commercial use. One such signal is a signal where the carrier frequency is phase-modulated by navigation data including information on the orbit of the satellite and is then further spread spectrum modulated by a C/A (Clear acquisition) code unique to the satellite.

The GPS receiver generates a code synchronized with the C/A code of the received signal for performing inverse spread spectrum of the received signal. A carrier frequency is then generated and synchronized with the carrier frequency of the received signal to reproduce the navigation data.

The GPS receiver includes an I register, Q register, and a carrier generating circuit for performing synchronous tracking of the carrier frequency with the aid of a Costas loop. The GPS receiver also includes an E register, L register, and a code generating circuit for performing synchronous tracking of code with that aid of a Delay Lock Loop (DLL).

The carrier frequency and the code generated in the receiver are supplied to the I register and Q register in order to determine a correlation with the received signal. The frequency of a carrier and the frequency of the code generated in the receiver are varied to search for a peak value of the correlation between the received signal so that the signal from a desired satellite is properly acquired.

After the signal from the GPS satellite has been acquired, the phase difference between the received signal and the carrier frequency generated in the receiver is determined based on the contents of the I register and Q register in order to control the carrier generating circuit to perform synchronous tracking of the carrier component of the received signal. At the same time, a phase difference between the code of the received signal and the code generated in the receiver is determined based on the contents of the E register and L register in order to control the code generating circuit to perform synchronous tracking of the code component of the received signal.

FIGS. 4 and 5 illustrate the RF circuit and signal processing circuit, respectively, as used in a prior art GPS receiver.

In FIG. 4, the radio wave from a GPS satellite is received via an antenna 1 and is then amplified by a low noise amplifier 2. The amplifier signal is then mixed with the output of a local oscillator 4 by a mixer 3 which converts the amplifier signal into an intermediate frequency. The intermediate frequency passes through an IF band-pass filter 5 which rejects unwanted noise and interference in the signal. The intermediate frequency signal is then amplified by an IF amplifier 6. Finally, the intermediate frequency is one-bit quantized by a limiter 7 before being output as an IF signal to the signal processing circuit in FIG. 5.

A reference oscillator 8 supplies a reference signal to the local oscillator 4. The local oscillator 4 is implemented in the form of Phase Locked Loop (PLL) which is locked on the reference signal from the reference oscillator 8. The Phase Locked Loop provides the local oscillator frequency to the mixer 3 for converting the signal from the satellite into an intermediate frequency signal. The reference oscillator 8 also supplies a reference clock to the signal processing circuit in FIG. 5.

In FIG. 5, the IF signal is supplied to an EXOR (Exclusive OR) gate 1 where the IF signal is multiplied with the code signal from the code generating circuit 12. The coincidence of each bit of code between the code of the IF signal and the code generated in the receiver is determined so that the output of EXOR has no code component when the code of the IF signal and the generated code are the same.

The output of the EXOR 1 is directed to the UP terminals of an I counter and Q counter. The I counter 13 and Q counter 14 take the form of a synchronous up/down counter. The counters 13 and 14 are incremented on the rising edge of a clock signal supplied to CK terminal when the input to the UP terminal is a logic 1. Correspondingly, the counters 13 and 14 count down when the input to UP terminal is a logic 0. The carrier generating circuit 15 generates clock signals ICK and QCK with the same frequency as predetermined by a CPU 16. The clock signal ICK is 90 degrees out of phase with the clock signal QCK. The clock signals ICK and QCK are supplied to the I counter 13 and Q counter 14, respectively.

At the end of each code signal cycle the values of the I counter 13 and the Q counter 14 are loaded into the I register 17 and the Q register 18, respectively. The contents of the registers are transferred to the CPU 16 via a data bus. During synchronous tracking of the signal, the CPU 16 manipulates the values in the I register and Q register in order to determine the phase difference I between the IF signal and the clock signal ICK and the phase difference Q between the IF signal and the clock signal QCK. During carrier acquisition, the CPU calculates the value of $I^2+Q^2$ to determine the signal strength of the received signal.

The code generating circuit 12 generates three signals synchronized with the code component of the received signal; a CODE signal in phase with code component in the received signal, an EARLY signal with a phase which is 0.5 chip leading with respect to the phase of CODE signal by 0.5 chips, and a LATE signal with a phase which lags the phase of the CODE signal by 0.5 chips. The content of the original C/A code signal received from the satellite is provided to the code generating circuit 12 by the CPU 16, and the contents of the three synchronized signals generated by the code generating circuit 12 are identical to the contents of the original C/A code.

The CPU controls the CODE signal, EARLY signal, and LATE signal so that the phases of these signals are varied to lead or lag by a predetermined value as described above. The code generating circuit 12 also generates an EPOCH signal synchronized with the CODE signal and supplies it to the counter controlling circuit 19 and CPU 16. The EPOCH signal is set with a logic 1 value at the beginning of each CODE signal cycle and serves as a reference signal for controlling counters and registers.

The IF signal is compared with the clock signal QCK supplied by the carrier generating circuit 15 by the EXOR circuit 20. The resulting signal output by the EXOR circuit 20 is then compared with the EARLY signal supplied from the code generating circuit 12 by the EXOR circuit 21 and likewise compared with the LATE signal by the EXOR circuit 22. The output of the EXOR circuit 21 is supplied to the UP terminal of E counter 23, and the output of the EXOR circuit 22 is supplied to the UP terminal of the L counter 24. The rising edge of the clock signal ELCK output from the clock generating circuit 27 causes the E counter 23 and L counter 24 to count up when the UP terminal is a logic 1, and count down when the UP terminal is a logic 0.

At the end of each code signal cycle the values of the E counter 23 and L counter 24 are stored into the E register 25 and L register 26, respectively. The contents of the E register 25 and L register 26 are then transferred to the CPU 16 via the data bus. The contents of the E register 25 and L register 26 represent the degrees of correlation between the IF signal and the LATE signal. The CPU 16 calculates the difference between the contents of the E register and L register during synchronous tracking of code to determine the phase difference between the code component in the IF signal and the CODE signal output from the code generating circuit 12.

The four counters 13, 14, 23, and 24 each include an enable terminal EN and a clear terminal CL for controlling the counting operation of these counters. A logic 1 supplied to the EN terminal enables the counting operation of the counters and a logic 0 inhibits the counting operation of the counters. A logic 1 supplied to the CL terminals causes the counters to clear to 0 on the rising edge of the clock signal at the CK terminal, while a logic 0 allows the value in the counters to remain unchanged.

The four registers 17, 18, 25, and 26 each include a load terminal LD so that the registers latch a value supplied to an input terminal Dn of the registers on the rising edge of the signal supplied to the LD terminal. The values of the registers remain the same until the signal supplied to the LD terminal goes high again irrespective of any changes in the signal level at the input terminal Dn after the value at the input terminals Dn has been latched.

The counter controlling circuit 19 outputs the enable signal EN, the clear signal CL, and the load signal LD to the respective counters and registers. These signals are based on the EPOCH signal supplied from the code generating circuit 12. The signals EN and CL are used for the respective counters while the signal LD is used for the respective registers. The counters perform counting operation by counting up or down during the period of C/A code. The value of the counters is latched by the corresponding registers on the rising edge of the load signal LD at the end of each code signal cycle.

The EPOCH signal is output from the code generating circuit 12 in a timed relation with the beginning of each code signal cycle to the counter controlling circuit 19 so that the EN signal can be set to a logic 0 in order to halt operation of the respective counters. The output of the load signal LD is then set to a logic 1 so that the values of the respective counters can be latched into the corresponding registers. After the values of the counters have been latched by the corresponding registers, the counter controlling circuit 19 outputs the clear signal CL to the counters in order to clear the contents of the counters. The EN signal is then set to a logic 1 which causes the counters to resume their counting operations for the next cycle of the C/A code.

The clock generating circuit 27 provides a clock signal ELCK and a master clock signal MCK, which are based on the reference clock signal supplied by the reference oscillator 8 in the RF circuit in FIG. 4. The master clock MCK is supplied to the code generating circuit 12, carrier generating circuit 15, and counter controlling circuit 19 while the clock ELCK is supplied to the E counter 23 and L counter 24.

The CPU 16 executes the receiver-controlling program stored in the ROM 28 by the use of the RAM 29. The EPOCH signal is input to the interrupt terminal INT of the CPU in order to activate the interruption handling program of the CPU 16. The interruption handling program causes the CPU to read in the contents of the respective registers according to the timing supplied by the EPOCH signal.

Prior to the recognition of a signal from a satellite, the CPU 16 controls the carrier generating circuit 15 so that GPS receiver can search for the carrier and the C/A code of the received signal. The code generating circuit 15 is also controlled by the CPU 16 so that the GPS receiver can search for the phase of the C/A code of the received signal. The frequency range in which the search or carrier frequency is conducted is dictated by the Doppler frequency range of the signal from the satellite and the frequency error of the reference oscillator 8. The search for the phase of the C/A code is conducted for a length of time equal to one cycle of C/A the code signal, i.e., 1023 chips.

During the search operation, the CPU 16 examines the magnitudes of correlation for a peak value at a carrier frequency while varying the phase of the code by one chip at a time. Upon completing the search for 1023 chips, the CPU increases the thus determined the carrier frequency by a predetermined amount and conducts a search for the phase of the C/A code at the new carrier frequency. One millisecond is required to detect a value of correlation of a code signal and this time is equal to the amount of time necessary to complete one cycle of the code signal.

Therefore the time required for a complete search of the frequency and phase is equal to the total number N of frequency increments multiplied by the time necessary to search through 1023 chips, i.e., 1023N milliseconds. The CPU 16 calculates the values indicative of correlation, i.e., values of $I^2+Q^2$ and $I + Q$ from the contents in the I register and Q register. When a calculated value exceeds a predetermined corresponding threshold value, the CPU 16 determines that the signal from the satellite has been properly acquired, and the CPU 16 terminates search operation to subsequently perform the tracking operation of the received signal.

During synchronous tracking operation of the received signal, the CPU 16 calculates the phase difference between the received signal and the carrier signal generated by the carrier generating circuit 15 based on the values in the I register 17 and the Q register 18. The calculated values then undergo an arithmetic operation by the loop filter. Using the results of arithmetic operation by the loop filter, the CPU 16 controls the carrier generating circuit 15 so that the frequency of the carrier signal generated in the receiver follows the frequency of the received signal. At the same time, the CPU 16 determines the phase difference between the C/A code of the received signal and the code signal generated by the code generating circuit 12 based on the values in the E register 25 and L register 26. The calculated phase difference then undergoes an arithmetic operation by a loop filter. Using the result of the arithmetic operation by the loop filter, the CPU 16 controls the code generating circuit 12 so that the phase of code follows that of the received signal.

The search operation is conducted by the prior art signal processing circuit illustrated in FIG. 5 on the signal being received for both carrier frequency and the phase of code. Thus, the time required for calculating the correlations for carrier frequency and the phase of the code should be substantially equal to one cycle of the code. Times shorter than one cycle of the code result in a spurious peak in correlation value which in turn causes error detection during phase search. Therefore, the time required for calculating correlation is primarily dictated by one cycle of the code.

This implies that the time required to properly acquire the signal from a satellite in the worst case is as long as the time of one cycle times the number of steps dictated by the range in which the carrier frequency and code phase are searched for. Moreover, the use of an inexpensive reference oscillator with a large frequency error requires a frequency search in a wider range which in turn causes longer acquisition time.

SUMMARY OF THE INVENTION

An object of the invention is to provide a method for processing signals in a GPS receiver where acquisition time is minimized. The received signal is quantized and is then stored in memory. The correlation between the received signal and the code signal generated in the receiver is determined while reading the data in the memory at a rate different from that at which the data was stored, thus searching for the carrier frequency and code phase of the received signal.

BRIEF DESCRIPTION OF THE DRAWINGS

Features and other objects of the invention will become more apparent from the description of the preferred embodiment with reference to the accompanying drawings in which.

DETAILED DESCRIPTION OF THE PREFERRED EMBODIMENTS

Figure 1:
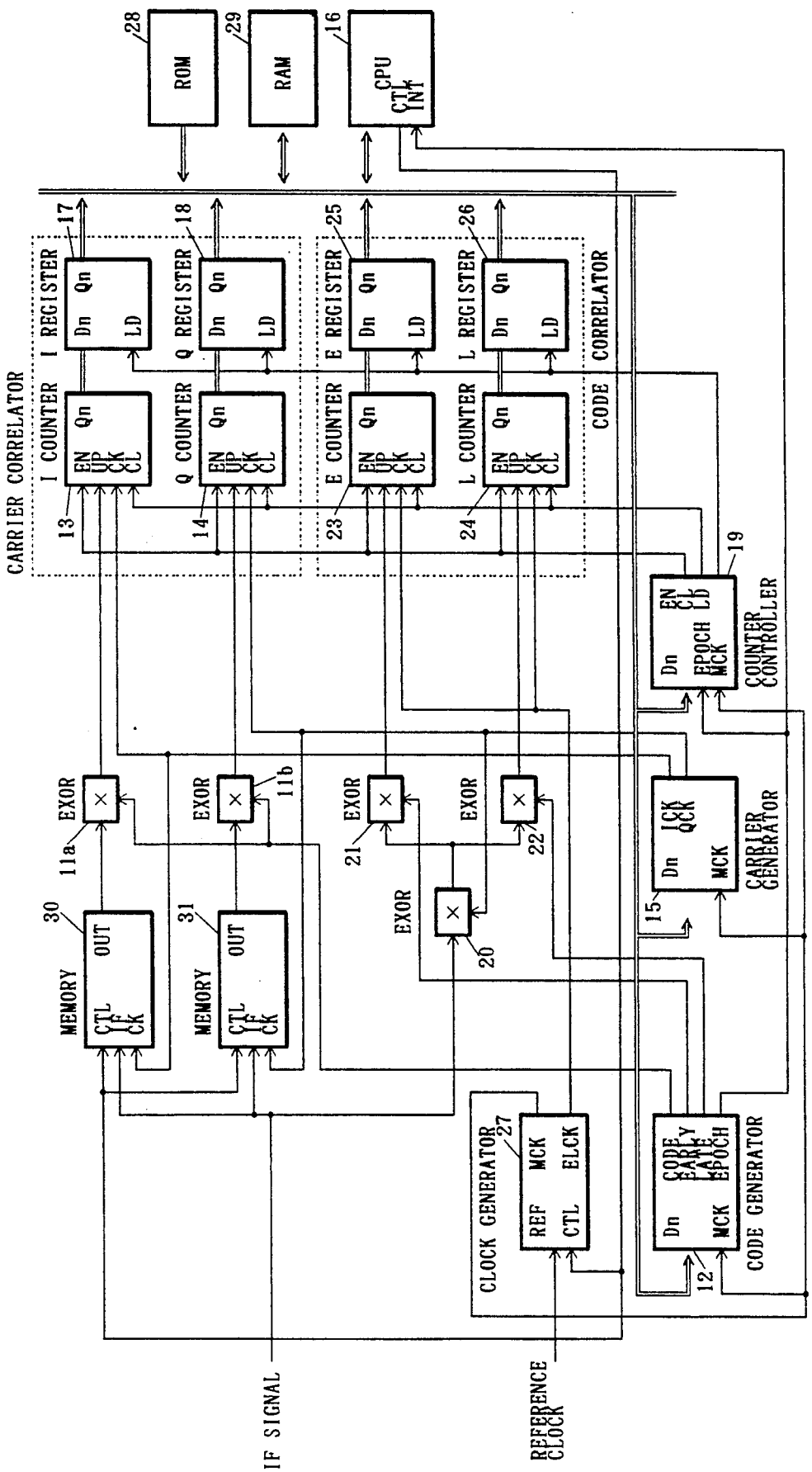
FIG. 1 shows a signal processing circuit of a GPS receiver according to an embodiment of the present invention.

FIG. 1 illustrates an embodiment of a signal processing circuit for a GPS receiver according to the present invention. Elements similar to those used in the prior art illustrated in FIG. 5 are given like numerals.

Figure 5:
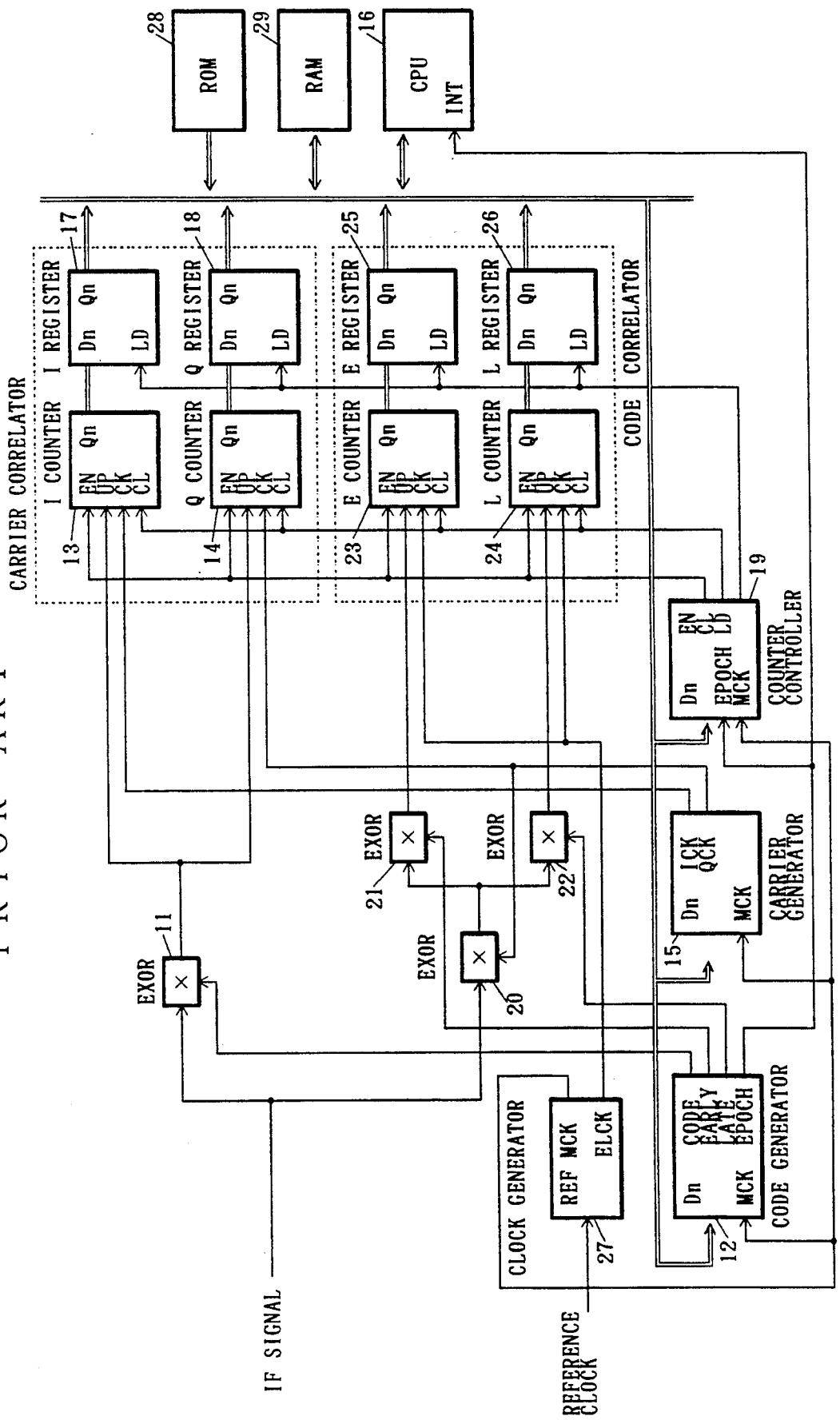
FIG. 5 shows a signal processing circuit for a GPS receiver according to the prior art.

The circuit in FIG. 1 differs from that in FIG. 5 in that two memories 30 and 31 are provided each of which is followed by an exclusive-OR circuit (EXOR) 11a and 11b, respectively. A clock generator 27 provides master clock MCK in response to an instruction from the CPU 16. The master clock MCK generates different frequencies for writing the IF signal to the memories 30 and 31 and for reading the IF signal from the memories 30 and 31.

The IF signal is sampled at a carrier frequency generated by the carrier generator 15 and is stored once in each of the memories 30 and 31. The stored IF signal is read from each of the memories 30 and 31 during each search for the phase of the code at a rate different from the rate at which the IF signal was written to the memories 30 and 31. Each appropriate IF signal output from the memories 30 and 31 is then directed to the I counter 13 and Q counter 14, respectively.

The CPU 16 sends a signal to the CTL terminals of the memories 30 and 31 so that the memories 30 and 31 are set in the write mode or read mode. When the CTL terminal is set to a logic 0, the memories 30 and 31 are set to the write mode where the IF signal is sampled at a rate equal to the clock input at the CK terminal and is stored in the memories 30 and 31. It should be noted that the IF signal is actually read into the memories at a rate equal to the clock input at the CK terminal but another way of looking at the same circuit operation is to "sample" the IF signal by the clock at the CK terminal and then to store the samples of the IF signal to the memories 30 and 31. While the IF signal is being written to the memories 30 and 31, the IF signal input to the IF terminal is also passed directly to the OUT terminal of the memories 30 and 31. When the CTL terminal is set to a logic 1, the memories 30 and 31 are set to the read mode where the IF signals are output to the OUT terminals at a rate equal to the clock input at the CK terminal.

The clock generator 27 adjusts the frequency of the master clock MCK in response to the control signal at the CTL terminal. The master clock MCK is supplied to the code generator 12, carrier generator 15, and the counter controller 19. The frequency of the master clock MCK is set to a first frequency when the CTL signal is set to a logic 0, and to a second frequency which is ten times higher than the first frequency when the CTL signal is set to a logic 1. By setting the frequency of the master clock MCK to a rate ten times faster than the first frequency, the code generator 12, carrier generator 15, and the counter controller 19 can operate at a rate ten times faster than before. Correspondingly, the frequencies of the code and carrier are also ten times higher.

Before searching for the carrier frequency and code phase, the CPU 16 sets the carrier frequency of the carrier generator 15 to a predetermined value and then sets the CTL signal to a logic 0 in order to store the IF signal at the thus set carrier signal into the memories 30 and 31. The IF signal is first recorded for a time length equal to 1 millisecond, which is equal to the amount of time necessary to complete one cycle of the code signal. After the selected carrier frequency has been stored in memory, the CPU 16 sets the CTL signal to a logic 1 in order to set the memories 30 and 31 to the read mode and in order to increase the frequency of the master clock MCK generated by the clock generator 27 to the second frequency so that the IF signals in the memories 30 and 31 are read out at a rate ten times faster than the rate at which the IF signals were written.

When the master clock MCK is set to the second frequency, the frequencies of the clock signals supplied by the carrier generator 15 have frequency ten times faster than the actual carrier frequency so that the I counter 13 and Q counter 14 can operate at a rate ten times faster than the rate at which the IF signals were written.

The CPU 16 sets a predetermined value of the code phase for the IF signals read from the memory in order to determine the value of correlation which in turn is compared by the CPU with a threshold value for the peak value of correlation. The CPU 16 searches for a peak of correlation while incrementing the code phase by one chip each time if the value of correlation does not exceed the threshold value. The time required for one complete search for frequency and phase can be calculated by multiplying 1023 by the total number of increments and by the time necessary to complete the search for one increment. A tenth of a millisecond is required to detect the value of correlation of the code signal because of the increased clock speed, and as a result the search for the peak of correlation can be completed in one tenth the time required by the prior art signal processing circuit.

Once the CPU 16 acquires the correct signal from the desired satellite, the CPU 16 sets the CTL terminal to a logic 0, which allows the IF signal supplied to the memories 30 and 31 to directly pass from the IF terminal to the OUT terminal so that the I register 25 and Q register 26 are available for synchronous tracking of the received signal.

Figure 2:
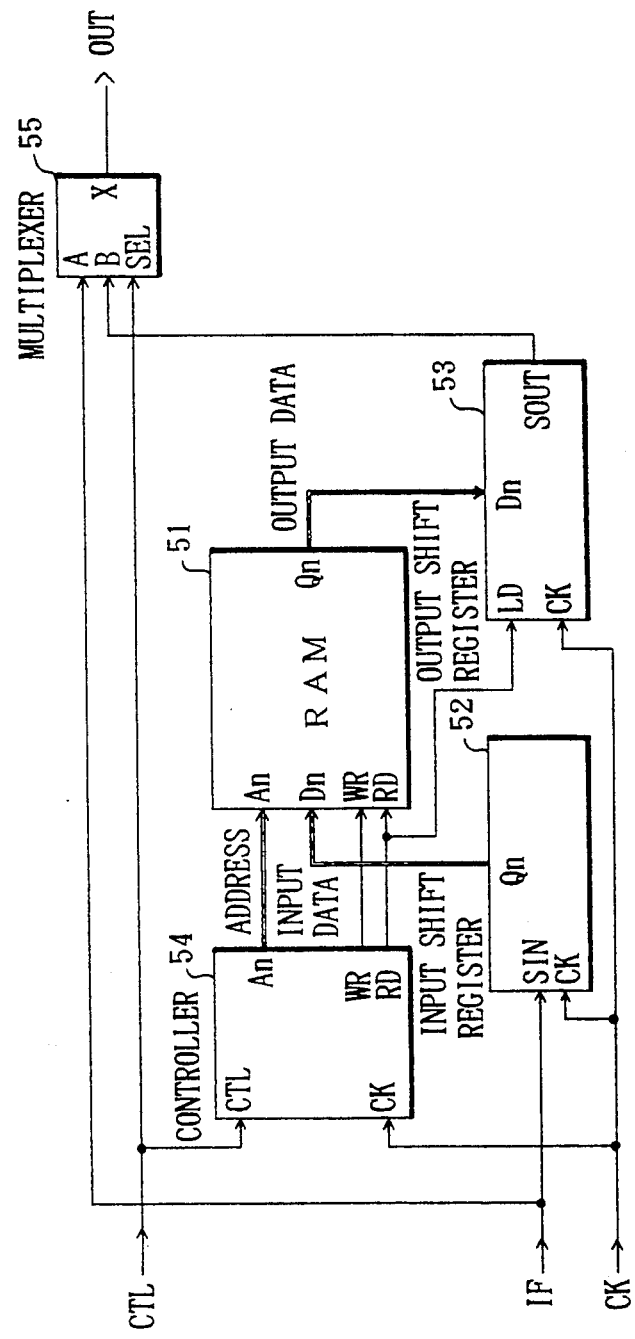
FIG. 2 shows a first embodiment of a memory means for use in the signal processing circuit of the GPS receiver illustrated in FIG. 1.

FIG. 2 shows a first embodiment of one of the memories 30 or 31 in the form of a random access memory (RAM) bank. When the WR terminal of a RAM 51 is set to a logic 1, the RAM 51 is set to the write mode where one-word data consisting of eight bits of data is input to terminals Dn of the RAM 51 and stored into a memory location determined by the address An. When the RD terminal of the RAM 51 is set to a logic 1, the RAM 51 is set to the read mode where the one-word of data which is stored at address An is output to the Qn terminal. The RAM has at least as many memory locations as there are values of IF signal to be recorded. The number of values of IF signal correspond to the time required for calculating the correlation of signal for one complete cycle of code.

An input shift register 52 performs the serial-to-parallel conversion of the IF signal before the values of IF signal are written into the RAM 51. The IF signal input to the SIN terminal is loaded to the shift register 52 on the rising edge of the clock CK signal so that the serial data of the IF signal can be converted to parallel data and output to the Qn terminals.

The output shift register 53 reads in one-word of parallel data from the RAM 51 when the LD terminal is a logic 1, and outputs the one-word data on a bit-by-bit basis to the SOUT terminal at the rising edge of the clock CK.

The control circuit 54 generates address signal An, write signal WR, and read signal RD in response to the CTL signal from the CPU 16 and the clock CK provided by the carrier generator 15. The control unit 54 controls the writing of data in RAM 51 and the reading of data from RAM 51. While the CTL terminal is a logic 0, the input shift register 52 reads in one word of data. After a predetermined delay equal to the amount of time necessary for the input shift register 52 to read in one word of data and convert it from serial format to a stable parallel format ready to be written to the RAM 52, the control circuit 54 increments the address signal An to the next address and outputs a write signal WR to the RAM 51 causing the contents of the shift register 52 to be written in the RAM 51. When the CTL terminal is a logic 1, the control circuit 54 outputs the address signal An and after a predetermined delay equal to the amount of time necessary for the RAM 51 to place one word of data in a stable format on the output data bus Qn, a read signal RD is output to the output shift register 53 so that the data is read from the RAM 51 to the second shift register 53.

The multiplexer 55 directs the IF signal input to terminal A or the signal from the output shift register signal at terminal B to an output terminal X based on the CTL signal from the CPU provided to terminal SEL. When terminal SEL is a logic 0, the IF signal at terminal A is output to the terminal X. When terminal SEL is a logic 1, the signal input at terminal B is output to the output terminal X. The CTL signal at terminal SEL is set to logic 0 by the CPU so that the IF signal input to the A terminal is directly output to the output terminal X during synchronous tracking of the received signal.

Figure 3:
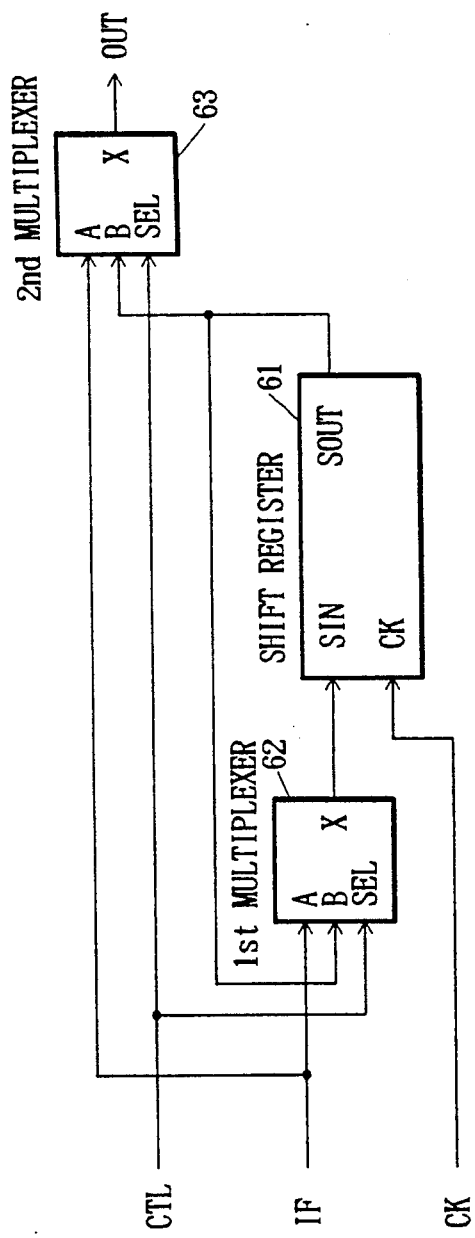
FIG. 3 shows a second embodiment of a memory means for use in the signal processing circuit of the GPS receiver illustrated in FIG. 1.
Figure 4:
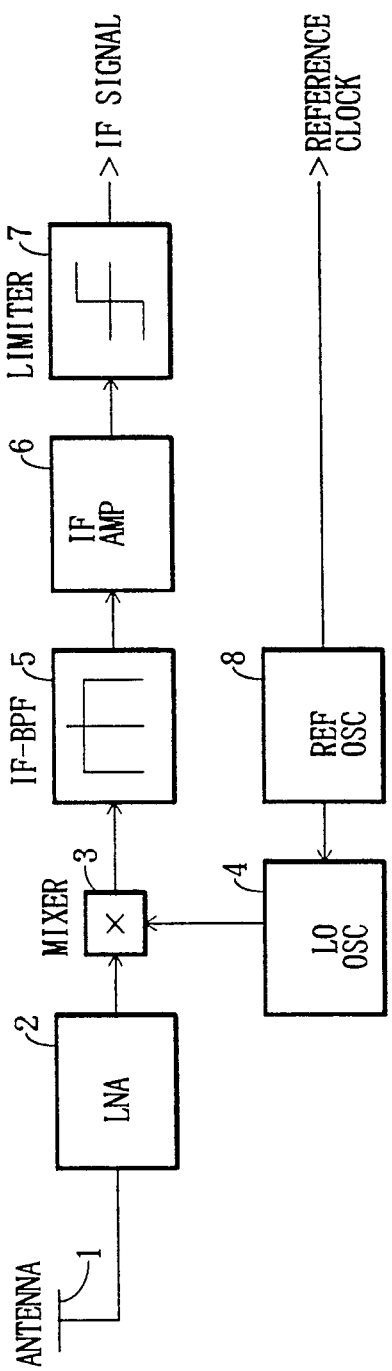
FIG. 4 is a block diagram showing an RF/IF circuit for a GPS receiver according to the prior art.

FIG. 3 shows a second embodiment of one of the memories 30 and 31. A shift register 61 consisting of D type flip flops connected in series includes as many flip flops as there are values of IF signal to be recorded in one cycle of code. The shift register 61 reads in the IF signal input at the SIN terminal in response to the signal at the clock CK terminal, provided by the carrier generator 15. The values of IF signal must be shifted as many times as there are flip flops before the values of IF signal will appear at the OUT terminal.

When the CTL signal provided by the CPU is a logic 0, the first multiplexer 63 selects the signal at terminal A. The shift register 61 is loaded with the sampled IF signal based on the timing of signal supplied to the CK terminal by the carrier generator 15, and at the same time, the second multiplexer 63 selects terminal A so that the actual IF signal appears as the OUT signal at the terminal X of the second multiplexer 63.

When the CTL signal is a logic 1, the first multiplexer 62 selects terminal B so that the signal on the SOUT terminal of the shift register 61 is directed to the SIN terminal via the first multiplexer 62. Thus, the samples of IF signal loaded in the shift register 62 can be shifted based on the clock CK to continuously rotate through the shift register 61 and the first multiplexer 62. The second multiplexer 63 also selects terminal B when the CTL signal is a logic 21 so that the signal appearing at the SOUT terminal of the shift register 61 is directed to the terminal X of the second multiplexer 63.

Two identical circuits are required in order to implement memories 30 and 31 when the invention is embodied by using the circuit in FIG. 2. The memories 30 and 31 can also be implemented in a single circuit with a single RAM bank with a larger memory capacity and more complex peripheral circuits for the handling of the respective input and output signals.

This can be implemented, for example, by dividing the whole memory area of the single RAM in half, into odd-numbered addresses and even-numbered addresses, or by storing each of the words form the I resister and Q register into a different half of the memory space at the respective address.

What is claimed is:

1. A method for searching a carrier frequency and code phase of a signal received by a GPS receiver, comprising steps of:
   quantizing the received signal;
   sampling the quantized signal at a first speed by a carrier frequency generated in the receiver;
   storing the samples in a memory at said first speed;

reading the samples from the memory at a second speed faster than said first speed; and determining a correlation between a code of the received signal from the samples read from the memory and a code generated in the receiver.

2. A method for searching a carrier frequency and code phase according to claim 1, wherein said second speed is ten times faster than said first speed.

* * * * *